(12) United States Patent
Shoji et al.

(10) Patent No.: US 7,873,756 B2
(45) Date of Patent: Jan. 18, 2011

(54) IMAGE PROCESSING APPARATUS AND CONTROL METHOD OF THE SAME

(75) Inventors: Fumio Shoji, Tokyo (JP); Takao Ikuno, Yokohama (JP); Masahiro Odaira, Kawasaki (JP); Yoshiaki Katahira, Yokohama (JP); Toru Fujino, Kawaguchi (JP); Kenji Kasuya, Yokohama (JP); Noritsugu Okayama, Kawasaki (JP); Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 11/631,194

(22) PCT Filed: Jul. 5, 2005

(86) PCT No.: PCT/JP2005/012726
§ 371 (c)(1),
(2), (4) Date: Dec. 29, 2006

(87) PCT Pub. No.: WO2006/006550
PCT Pub. Date: Jan. 19, 2006

(65) Prior Publication Data
US 2007/0247453 A1   Oct. 25, 2007

(30) Foreign Application Priority Data
Jul. 9, 2004   (JP)   ............... 2004-203707

(51) Int. Cl.
G06F 3/00 (2006.01)
(52) U.S. Cl. ............... 710/20; 710/2; 710/3; 710/5; 710/22; 710/31; 709/220; 709/223

(58) Field of Classification Search ............... 710/2, 710/3, 5, 20, 22, 31, 62; 709/220, 223
See application file for complete search history.

(56) References Cited

U.S. PATENT DOCUMENTS 6,334,161 B1   12/2001   Suzuki et al.

(Continued)

FOREIGN PATENT DOCUMENTS

JP   10283135   10/1998

(Continued)

OTHER PUBLICATIONS

Office Action, dated Jan. 1, 2008, in KR 10-2007-7000412.

(Continued)

*Primary Examiner*—Tariq Hafiz
*Assistant Examiner*—Jasjit S Vidwan
(74) *Attorney, Agent, or Firm*—Fitzpatrick, Cella, Harper & Scinto (57) ABSTRACT

This invention increases the design efficiency of an upper layer such as a job control means. To accomplish this, an image processing apparatus having a plurality of types of external interfaces (a USB and LAN) different in protocol has an external interface adaptor 203 which dynamically allocates external interfaces as objects of processing to lower layer IDs within a predetermined range, and a job controller 202 which controls execution of various types of jobs by using the lower layer IDs, and a value which the lower layer ID can take is constant regardless of the type of external interface.

13 Claims, 11 Drawing Sheets

U.S. PATENT DOCUMENTS

| | | |
|---|---|---|
| 6,425,019 B1 | 7/2002 | Tateyama et al. |
| 6,603,737 B1 | 8/2003 | Fukunaga et al. |
| 6,707,569 B1 | 3/2004 | Kato et al. |
| 6,874,082 B2 | 3/2005 | Tateyama et al. |
| 7,062,579 B2 | 6/2006 | Tateyama et al. |
| 7,076,550 B1 | 7/2006 | Noguchi et al. |
| 7,124,177 B2 | 10/2006 | Watanabe |
| 7,213,138 B2 | 5/2007 | Fukunaga et al. |
| 2004/0186928 A1 | 9/2004 | Fukunaga et al. |
| 2005/0138226 A1 | 6/2005 | Tateyama et al. |
| 2005/0240665 A1* | 10/2005 | Gu et al. .................... 709/220 |

FOREIGN PATENT DOCUMENTS

| | | |
|---|---|---|
| JP | 2000148650 | 5/2000 |
| JP | 2001-511558 | 8/2001 |
| JP | 2002-157177 | 5/2002 |
| KR | 10-0437849 | 7/2002 |
| WO | 99/05603 | 2/1999 |

OTHER PUBLICATIONS

Japanese Office Action dated Mar. 5, 2010 in counterpart Japanese Application No. 2004-203707.

* cited by examiner

| PROTOCOL ID | PROTOCOL AND PORT |
|---|---|
| 0 | LPR |
| 1 | 20 / tcp |
| 2 | 30 / tcp |
| 3 | 80 / tcp |
| ⋮ | ⋮ |
| ⋮ | ⋮ |
| N | |

FIG. 5

| LOWER LAYER ID | PROTOCOL ID |
|:---:|:---:|
| 0 | 5 |
| ⋮ | ⋮ |
| n | — |

IMAGE PROCESSING APPARATUS AND CONTROL METHOD OF THE SAME

TECHNICAL FIELD

The present invention relates to an image processing apparatus and image processing method.

BACKGROUND ART

Conventionally, an image processing apparatus having a plurality of external interfaces such as a local interface, e.g., a USB, and a remote interface, e.g., a LAN, is known (Japanese Patent Laid-Open No. 2000-148650).

In the conventional image processing apparatus as described above, however, an upper layer such as a job controller for controlling jobs directly recognizes differences between the external interfaces or differences between communication control protocols used by the external interfaces. Therefore, if the number of types of installed external interfaces increases and the communication control protocols diversify and complicate, the arrangement of the upper layer such as the job controller also complicates, and this is one main cause of a decrease in productivity of the whole apparatus.

In addition, different job controllers must be designed for apparatuses having different types of external interfaces installed, and this makes it difficult to efficiently produce a plurality of types of apparatuses different only in installed external interface, e.g., an apparatus having a LAN connecting function and an apparatus having no LAN connecting function.

DISCLOSURE OF INVENTION

The present invention has been made to solve the above problems of the prior art, and provides an image processing apparatus which allows efficient design of an upper layer such as a job control means.

A first aspect of the present invention is an image processing apparatus having a plurality of types of external interfaces different in protocol, characterized by comprising: identifier allocating means for dynamically allocating the external interfaces as objects of processing to identifiers within a predetermined range; and job control means for controlling execution of various types of jobs by using the identifiers, wherein a value which the identifier can take is constant regardless of a type of the external interface.

A second aspect of the present invention is a control method of an image processing apparatus having a plurality of types of external interfaces different in protocol, characterized by comprising: an identifier allocation step of dynamically allocating identifiers within a predetermined range to the external interfaces as objects of processing; and a job control step of controlling execution of various types of jobs by using the identifiers, wherein a value which the identifier can take is constant regardless of a type of the external interface.

A third aspect of the present invention is a control program of an image processing apparatus having a plurality of types of external interfaces different in protocol, characterized by causing the image processing apparatus to execute: an identifier allocation step of dynamically allocating identifiers within a predetermined range to the external interfaces as objects of processing; and a job control step of controlling execution of various types of jobs by using the identifiers, wherein a value which the identifier can take is constant regardless of a type of the external interface.

Other features and advantages of the present invention will be apparent form the following description taken in conjunction with the accompanying drawings, in which like reference characters designate the same or similar parts throughout the figures thereof.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

As an embodiment of an image processing apparatus according to the present invention, a multi function peripheral (to be referred to as an MFP hereinafter) capable of executing a plurality of jobs such as a scan job, print job, and facsimile job by one apparatus will be explained below.

Figure 1:
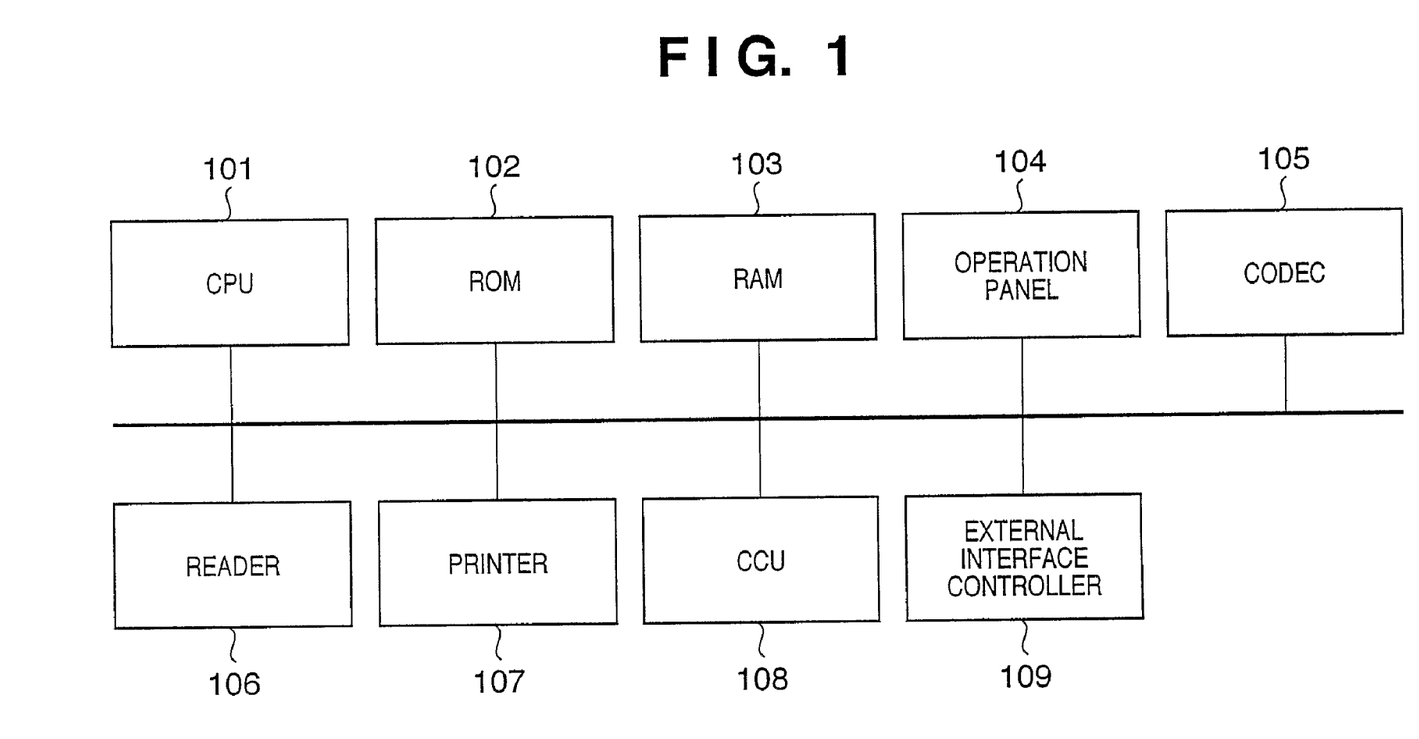
FIG. 1 is a block diagram showing the hardware configuration of an MFP as an embodiment of the present invention.

FIG. 1 is a block diagram showing the hardware configuration of the MFP as this embodiment.

A CPU 101 executes a program by reading out program instructions from a ROM 102, and controls the whole apparatus by using a RAM 103. The ROM 102 stores the program instructions to be executed by the CPU 101, and various permanent data. In some cases, the ROM 102 may also be a writable medium.

The RAM 103 stores, e.g., temporary data when the CPU 101 executes the program instructions, and image data. An operation panel 104 controls the user interface of the MFP. A CODEC 105 encodes and decodes the coding forms of various image data.

A reader 106 optically reads an original, and converts the read original into image data. A printer 107 prints the image data. A CCU 108 controls a facsimile communication protocol, and controls transmission/reception of facsimile data. An external interface controller 109 controls external interfaces such as a USB and LAN, and controls transmission/reception of various data.

Figure 2:
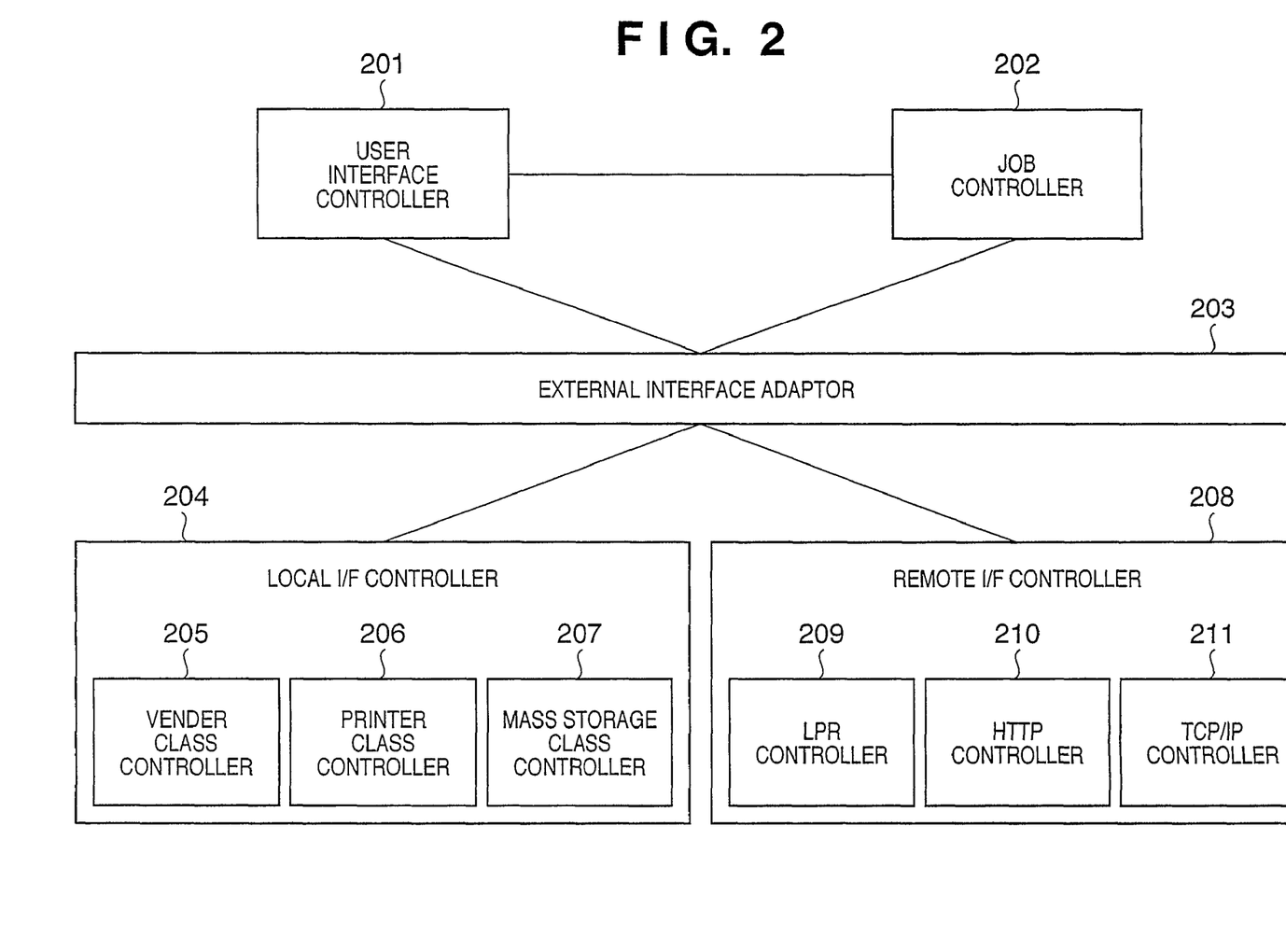
FIG. 2 is a block diagram showing the software configuration of the MFP as the embodiment of the present invention.

FIG. 2 is a block diagram showing the software configuration of the MFP.

A user interface controller 201 is a module which controls the user interface of the MFP. A job controller 202 is a module which controls execution of jobs such as scan, printing, fax, and copying. An external interface adaptor 203 provides the user interface controller 201 and job controller 202 with upper interfaces independent of differences between external interfaces, and manages the correspondence of the upper interfaces with external interfaces as lower interfaces.

A local interface controller 204 controls the whole local interface such as a USB. A vender class controller 205 controls a vender class when a USB is assumed as a local interface. A printer class controller 206 controls a printer class when a USB is assumed as a local interface. A mass storage class controller 207 controls a mass storage class when a USB is assumed as a local interface. A remote interface controller 208 controls the whole remote interface such as a LAN. An LPR controller 209 controls an LPR protocol, an HTTP controller 210 controls an HTTP protocol, and a TCP/IP controller 211 controls a TCP/IP protocol.

As shown in FIG. 2, the MFP as this embodiment has a USB and LAN as a plurality of types of external interfaces different in protocol, includes the external interface adaptor 203 as an identifier allocating means for dynamically allocating identifiers (lower layer IDs to be described later) within a predetermined range to external interfaces as objects of processing, and includes the job controller 202 as a job control means for controlling execution of various jobs by using the identifiers allocated by the external interface adaptor 203. Values which the identifiers can take fall within a predetermined range regardless of the type of external interface of the MFP.

Also, the MFP as this embodiment includes the user interface controller 201 as a user interface control means for performing control corresponding to designation input via the user interface, and, similarly to the job controller 202, the user interface controller 201 performs control by using the lower layer IDs as predetermined identifiers.

Figure 3:
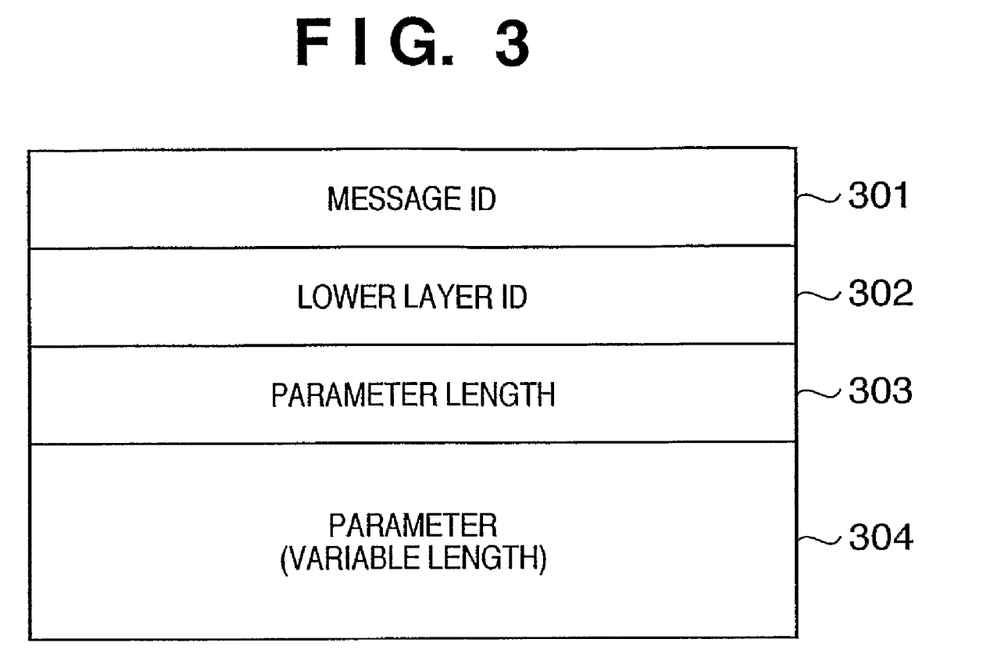
FIG. 3 is a view showing a message format exchanged between a user interface controller 201 or job controller 202 and an external interface adaptor 203, in the MFP as the embodiment of the present invention.

FIG. 3 is a view showing a massage format exchanged between the user interface controller 201 and job controller 202 as upper layers and the external interface adaptor 203.

As shown in FIG. 3, the message format includes a message ID 301 for identifying the type of message, a lower layer ID 302, a parameter length 303 indicating the length of a message parameter (304), and a parameter 304 added to each message. The length of the message parameter is variable for each message.

The lower layer ID 302 is a predetermined identifier allocated by the external interface adaptor 203, and is a simple number, e.g., 0 to 5. Values which the lower layer ID 302 can take are predetermined regardless of the type of installed external interface. In other words, the upper layers such as the user interface controller 201 and job controller 202 are common to MFPs having any external interfaces, and so designed as to be able to process the lower layer ID 302 within a predetermined range of, e.g., 0 to 5. This increases the versatility of the upper layers such as the user interface controller 201 and job controller 202.

Although the lower layer ID is a simple number in this embodiment, the present invention is not limited to this embodiment, so any identifiers can be used.

Figure 4:
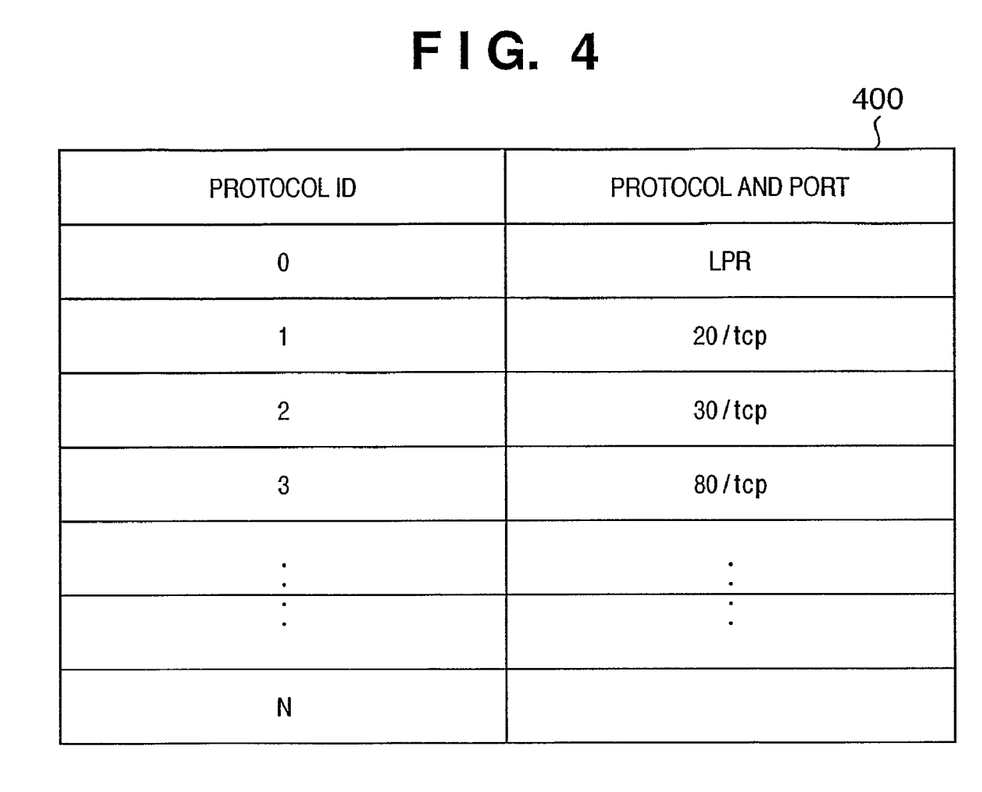
FIG. 4 is a view showing a protocol ID allocation table which manages the correspondence of protocol IDs with communication control protocols, in the MFP as the embodiment of the present invention.

FIG. 4 is a view showing a protocol ID allocation table 400. The protocol ID allocation table 400 shows the correspondence of protocol IDs with communication control protocols.

The protocol ID is an ID for uniquely identifying a communication control protocol, and is an identifier which indicates a communication control protocol itself. Assume that even when protocols (such as HTTP and FTP) in a broad sense are identical, if allocated port numbers are different, different protocol IDs are allocated. Although values from 0 to N are allocated as the protocol IDs in FIG. 4, the present invention is not limited to this embodiment, so any identifiers can be used as long as protocols can be identified.

The protocol ID allocation table 400 is stored in the ROM 102 or the like, and can be looked up by the external interface adaptor 203. Basically, in an MFP having different external interfaces, different protocol ID allocation tables 400 are stored. However, it is also possible to prepare, for all types of MFPs, a common protocol ID allocation table 400 in which protocol IDs are allocated to all protocols (e.g., USB, RS232C, IEEE1284 (parallel interface), IEEE1394, IEEE802.n, wireless LAN, FTP, HTTP, LPR, and UPnP) which can be installed in MFPs.

Figure 5:
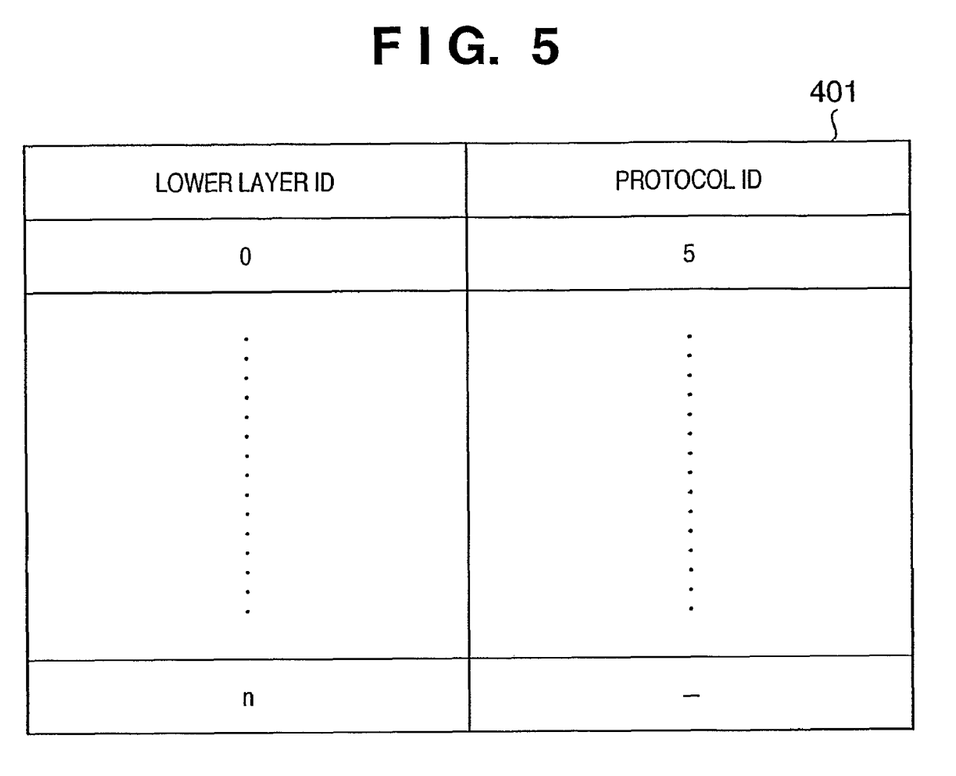
FIG. 5 is a view showing an ID management table which manages the correspondence of lower layer IDs with protocol IDs, in the MFP as the embodiment of the present invention.

FIG. 5 is a view showing an ID management table 401. The ID management table 401 shows the correspondence of predetermined lower layer IDs with the protocol IDs defined by the protocol ID allocation table 400. The external interface adaptor 203 manages the ID management table 401, and dynamically rewrites the ID management table 401 whenever processing using an external interface is performed. Accordingly, the total number of the lower layer IDs 302 can be much smaller than the number of types of protocols which can be processed in the MFP. For example, even when only five values are prepared as the lower layer IDs, unlimited protocols can be processed by dynamically rewriting the ID management table 401 for each processing performed via an external interface. As a consequence, the number of IDs processed by upper layers is small, so the arrangements of the user interface controller 201 and job controller 202 can be simplified. Note that the number of lower layer IDs prepared in the ID management table 401 represents the number of processes which can be performed in parallel with each other via external interfaces.

Since the ID management table 401 defines the correspondence of protocols with lower layer IDs, upper layers such as the user interface controller 201 and job controller 202 need only recognize the lower layer ID 302, i.e., need not recognize any protocol difference at all.

Figure 6:
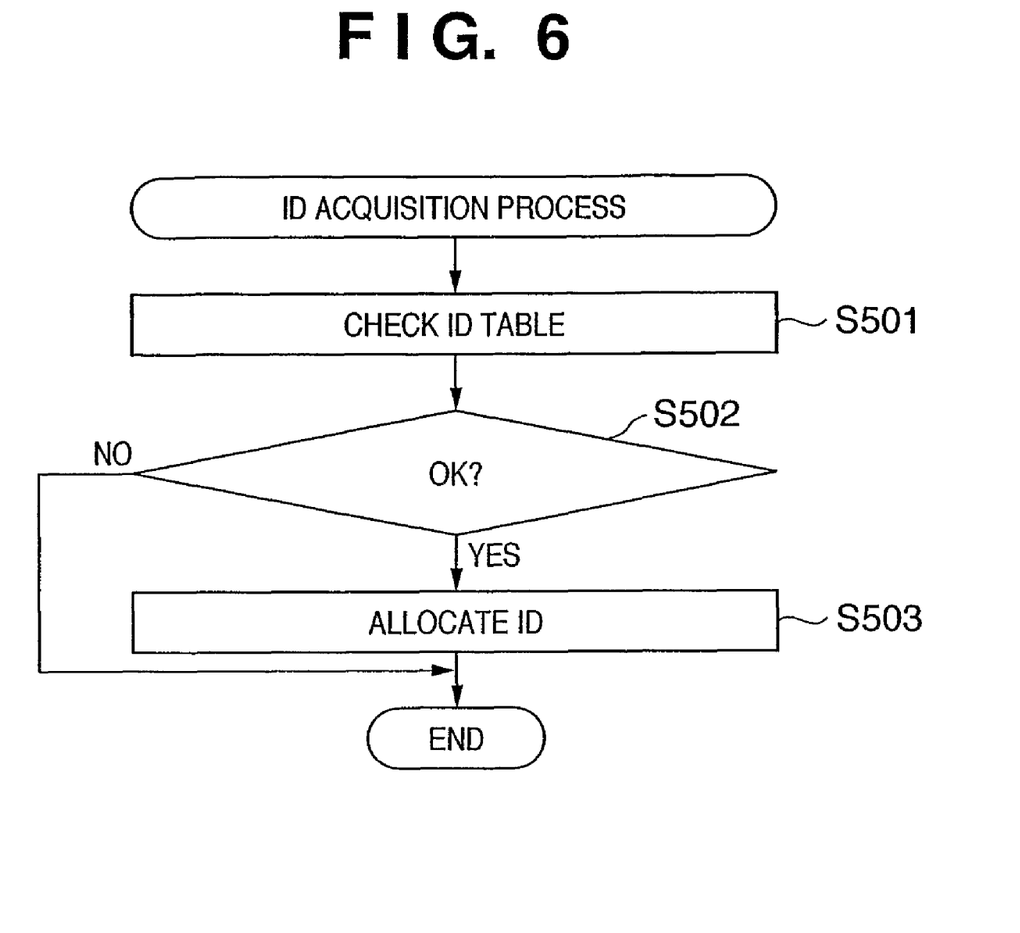
FIG. 6 is a flowchart showing a lower layer ID acquisition process which the user interface controller 201 or job controller 202 performs first when using an external interface, in the MFP as the embodiment of the present invention.

A lower layer ID acquisition process which the MFP performs first when a process request which designates an external interface is generated will be explained below with reference to a flowchart shown in FIG. 6.

This process has two cases, i.e., a case (first case) in which the external interface adaptor 203 performs the lower layer ID acquisition process in response to a process request from the user interface controller 201 or job controller 202, and a case (second case) in which a process request is generated from an external interface. Since the designation of a protocol ID is essential in the lower layer ID acquisition process, in the first case, the user interface controller 201 or job controller 202 requests the external interface adaptor 203 to perform the ID acquisition process by designating a protocol ID. However, the upper layer only designates the protocol of a lower layer as a connection destination, and does not change the process by recognizing differences between protocols. In the second case, the lower layer ID acquisition process is performed by a protocol ID by which a process request is generated.

An example of the first case is a case in which a user designates e-mail transmission from the operation panel. In this case, the user interface controller 201 notifies the external interface adaptor 203 of the protocol (e.g., SMTP) of a mail server, and generates a process request to the external interface adaptor 203. Even if the mail server has a plurality of protocols, differences in control between them are absorbed by changing the control of the external interface adaptor 203, so the user interface controller 201 need not recognize the differences. Another possible example of the first case is a case in which a command "scan an original image, and store the read image data in a storage device connected by a USB" is input from the operation panel. The user interface controller 201 sometimes generates a process request in this case as well by issuing a command which designates the storage device connected by a USB as an output destination of the read image data. Upon receiving these process requests, the external interface adaptor 203 derives a protocol ID to be used by the mail server or the protocol ID of the USB storage device by looking up the protocol ID allocation table 400, and allocates this protocol ID to an empty lower layer ID in the ID management table 401.

To perform processing in the MFP via an external interface, the external interface adaptor 203 first performs a process of acquiring the lower layer ID 302.

More specifically, in step S501, the ID management table 401 is checked to determine whether the ID management table 401 has an empty space (a lower layer ID to which no protocol ID is allocated).

If it is determined in step S501 that there is an empty space (OK), the flow advances from step S502 to step S503 to allocate a protocol ID to the empty lower layer ID, and the process is complete. The lower layer ID to which the protocol ID is allocated is transferred to the user interface controller 201 or job controller 202 which is to perform the processing. If it is determined in step S501 that there is no empty space (NG), ID allocation fails, and the process is terminated.

Figure 7:
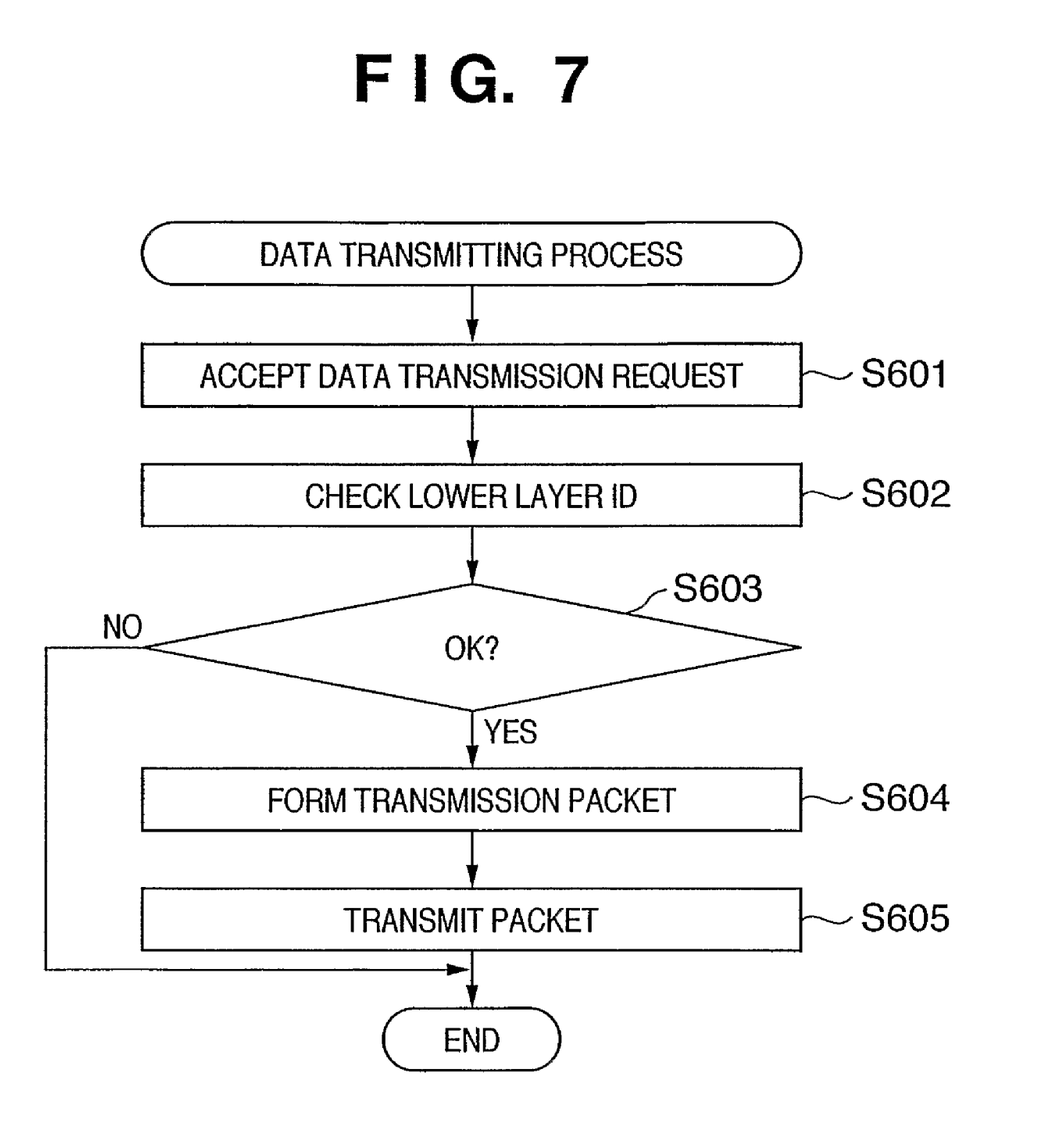
FIG. 7 is a flowchart showing processing by which the user interface controller 201 or job controller 202 transmits data, in the MFP as the embodiment of the present invention.

Processing which the external interface adaptor 203 performs when requested to transmit data by the user interface controller 201 or job controller 202 will be explained below with reference to FIG. 7.

When in step S601 the external interface adaptor 203 accepts a data transmission request from the user interface controller 201 or job controller 202, the flow advances to step S602. In step S602, the external interface adaptor 203 having received the data transmission request checks whether a lower layer ID is registered in the ID management table 401.

This data transmission request is formed in accordance with the message format shown in FIG. 3, and the lower layer ID to be checked is contained in the data transmission request.

If it is determined in step S602 that the lower layer ID 302 is registered in the ID management table 401 shown in FIG. 5, the flow advances from step S603 to step S604, and a protocol ID corresponding to the accepted lower layer ID 302 is derived by looking up the ID management table 401. In addition, a transmission packet of a protocol corresponding to the protocol ID is formed, and the formed packet is transmitted to a lower layer corresponding to the protocol ID (S605).

If it is determined in step S602 that the lower layer ID 302 is not registered in the ID management table 401, the data transmission request is discarded, and the processing is terminated. This case in which the lower layer ID 302 is not registered in the ID management table 401 is a case in which when the job controller 202 having started operating in response to a process request from a lower layer such as the local interface controller 204 or remote interface controller 208 requests the external interface adaptor 203 to perform the processing by using the lower layer ID 302 registered by the local interface controller 204 or remote interface controller 208, the lower layer ID 302 is already opened by the local interface controller 204 or remote interface controller 208 and does not exist. In this case, the job controller 202 requests the external interface adaptor 203 to acquire a new lower layer ID 302.

Figure 8:
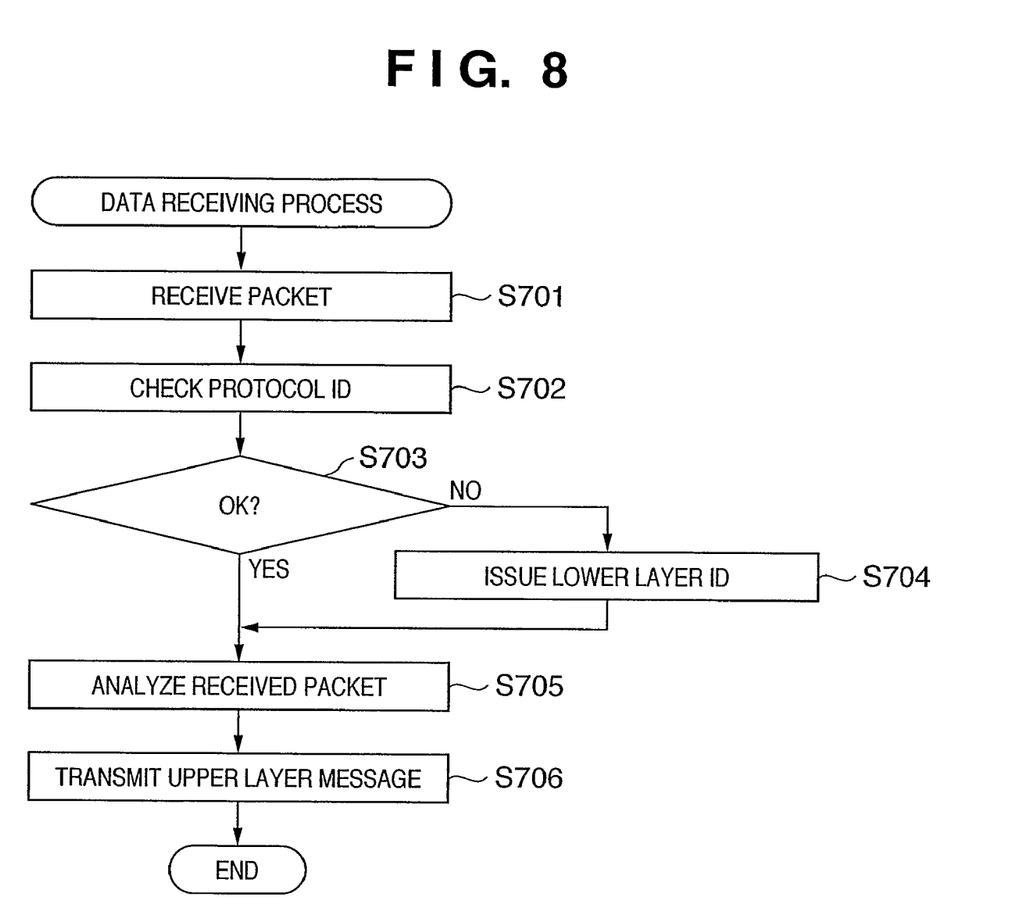
FIG. 8 is a flowchart showing the processing of data received from an external interface, in the MFP as the embodiment of the present invention.

Processing by which the external interface adaptor 203 transmits, to the user interface controller 201 or job controller 202, a packet received from a lower layer such as the local interface controller 204 or remote interface controller 208 will be described below with reference to FIG. 8.

When a packet is received from a lower layer in step S701, the flow advances to step S702 to determine whether a protocol ID corresponding to the received packet is registered in the ID management table 401.

If it is determined in step S702 that the received protocol ID is registered in the ID management table 401, the flow advances from step S703 to step S705.

If it is determined in step S702 that the received protocol ID is not registered in the ID management table 401, the flow advances from step S703 to step S704, and the protocol ID is allocated to an empty lower layer ID.

The timing of "job start" in FIGS. 10 and 11 to be described later is equivalent to the case in which the received protocol ID is not registered in the ID management table 401, and the external interface adaptor 203 acquires the lower layer ID 302 shown in FIG. 6. To transmit another job parameter, a page parameter, or page data shown in FIG. 10, the external interface adaptor 203 uses the received protocol ID because it is registered in the ID management table 401.

In step S705, the contents of the received packet are analyzed, and a message for the user interface controller 201 or job controller 202 is formed in accordance with the message format shown in FIG. 3. Additionally, in step S706, the formed message is transmitted to the user interface controller 201 or job controller 202, and the processing is terminated.

Figure 9:
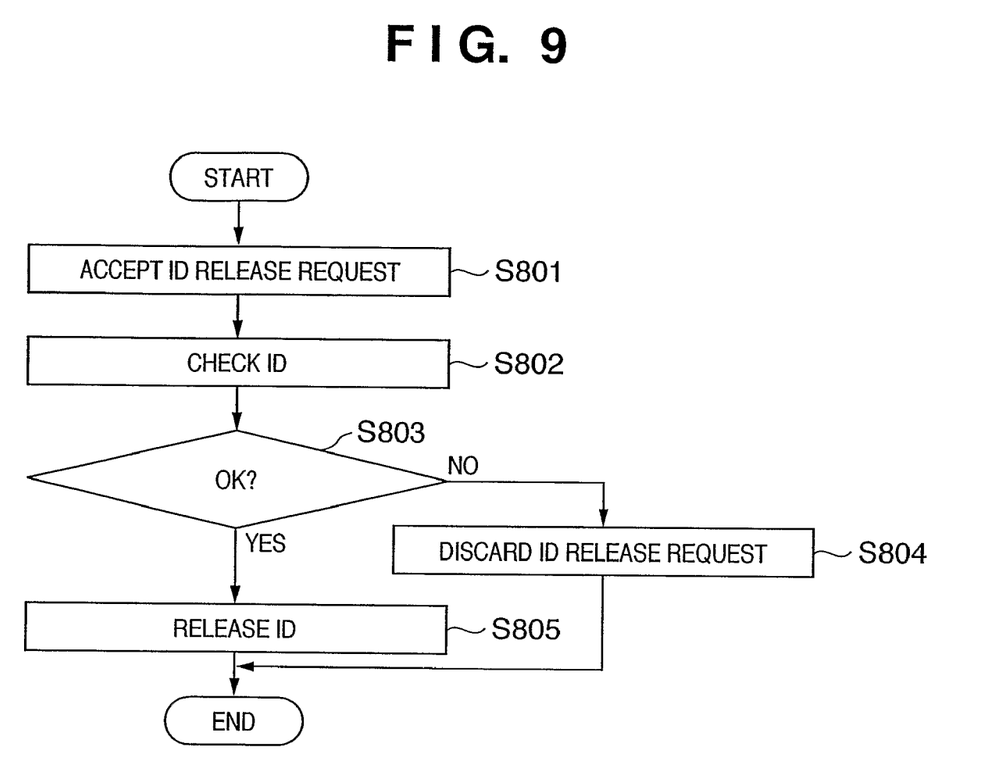
FIG. 9 is a flowchart showing an ID releasing process performed when an external interface is released, in the MFP as the embodiment of the present invention.

Processing by which the external interface adaptor 203 releases a lower layer ID will be explained below with reference to FIG. 9.

In step S801, the external interface adaptor 203 accepts a lower layer ID release request from the user interface controller 201 or job controller 202.

Figure 10:
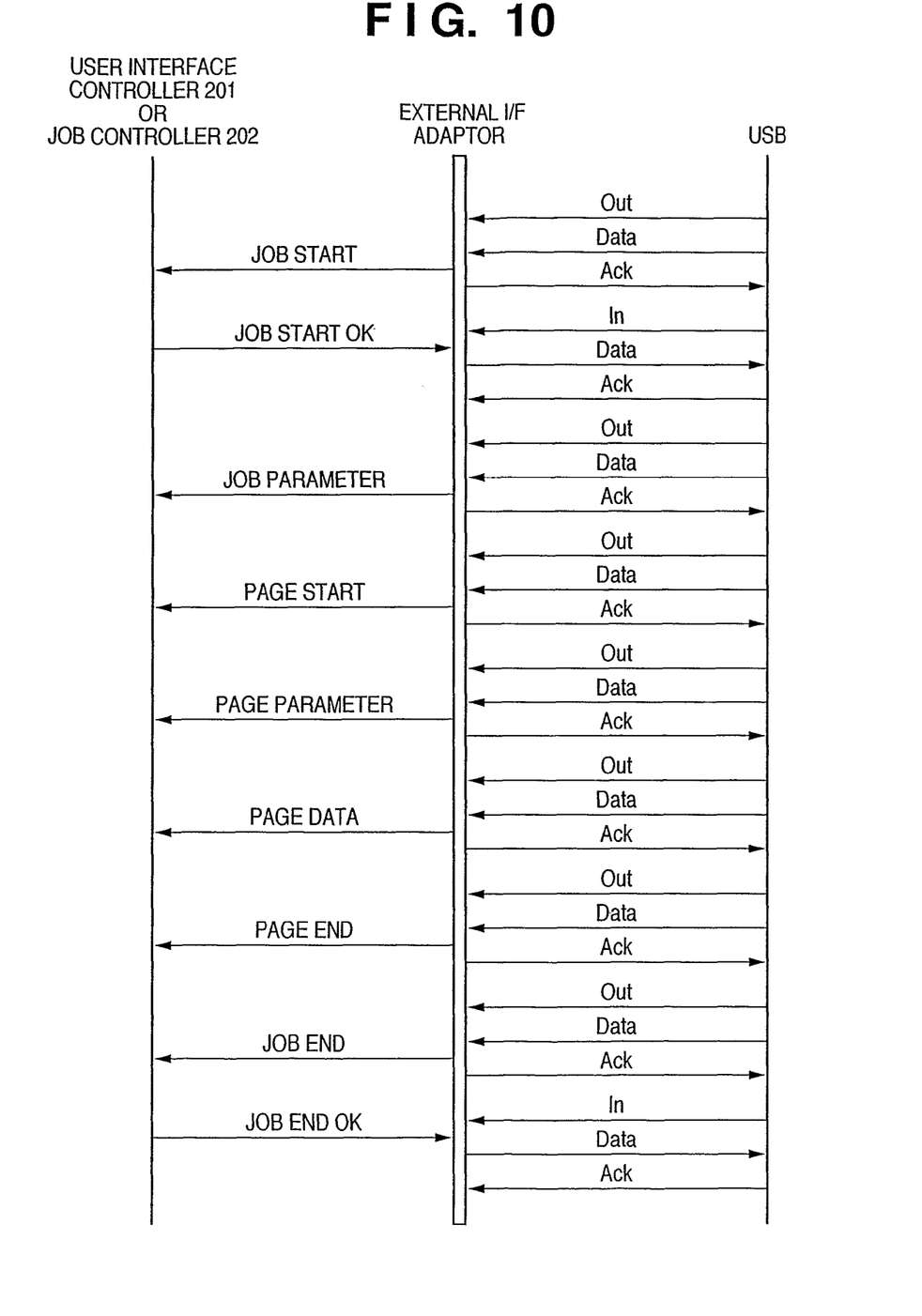
FIG. 10 is a sequence diagram showing the flow of a process of receiving data from a USB, in the MFP as the embodiment of the present invention.
Figure 11:
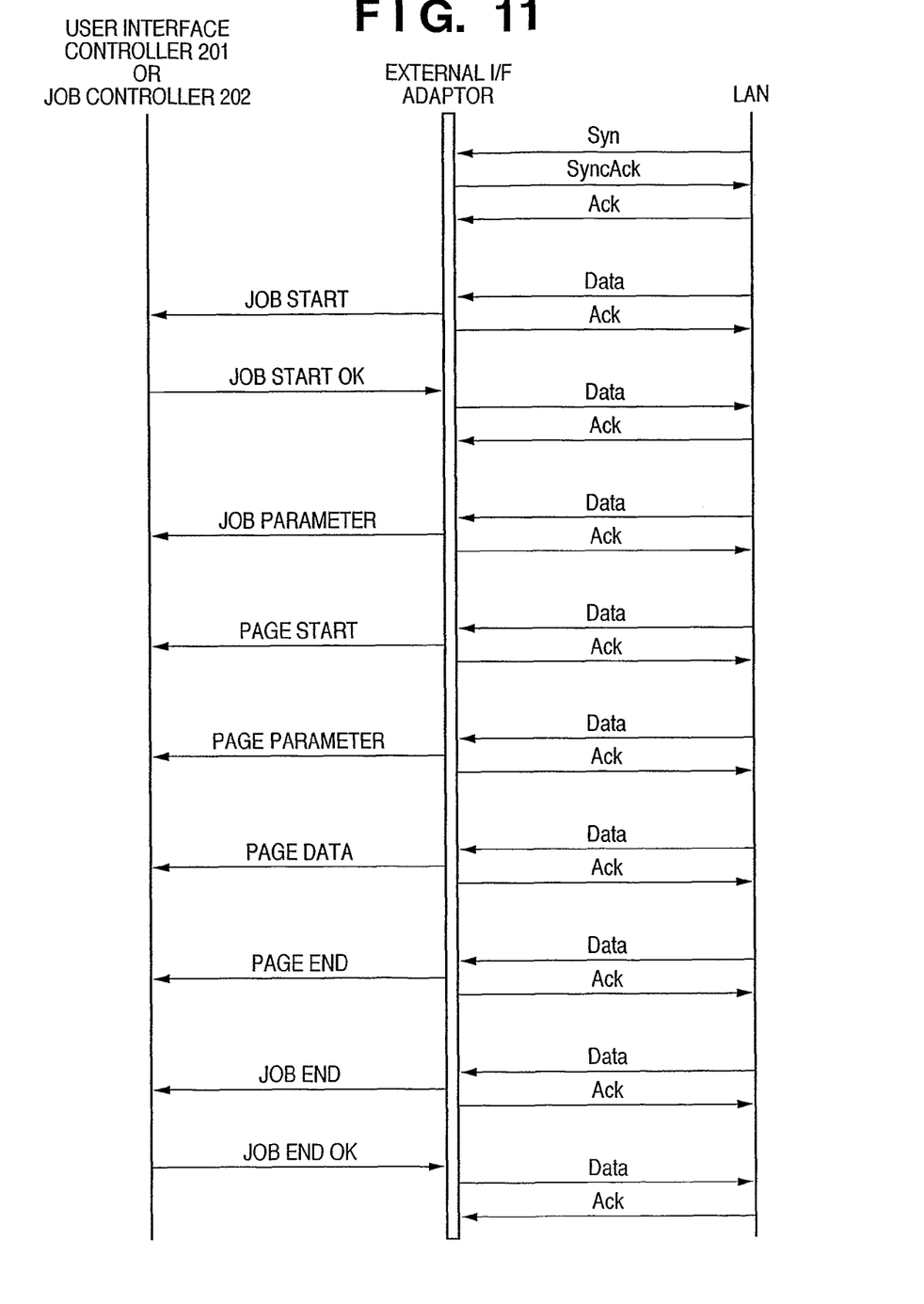
FIG. 11 is a sequence diagram showing the flow of a process of receiving data from a LAN, in the MFP as the embodiment of the present invention.

A case in which a lower layer ID release request is received from the user interface controller 201 or job controller 202 is more specifically a case in which a message "job end OK" shown in FIG. 10 or 11 is received from the user interface controller 201 or job controller 202.

Then, in step S802, the external interface adaptor 203 having received the lower layer ID release request checks whether the lower layer ID 302 is registered in the ID management table 401.

If it is determined in step S802 that the lower layer ID 302 is registered in the ID management table 401, the flow advances from step S803 to step S805 to delete the corresponding lower layer ID from the ID management table 401.

If it is determined in step S802 that the lower layer ID 302 is not registered in the ID management table 401, the flow advances to step S804 to discard the lower layer ID release request, and the processing is terminated.

Control sequences between the user interface controller 201 or job controller 202, the external interface adaptor 203, and the lower layer protocol when, for example, print data is received and the processes from FIGS. 6 to 9 are performed by the external interface adaptor 203 are as shown in FIGS. 10 and 11. As shown in FIGS. 10 and 11, even when the protocols of lower layers are different, the user interface controller 201 or job controller 202 can be controlled by the same message sequence.

In this embodiment as has been described above, the external interface adaptor 203 converts a protocol between an upper layer and external interface, so the upper layer can execute a job regardless of differences between external interfaces. Since external interfaces can be changed, added, and deleted only by changing the external interface adaptor, the software resource applicability improves, and the software quality and product quality can also improve.

Although the user interface controller 201 and job controller 202 are taken as examples of upper layers in this embodiment, the present invention is not limited to this embodiment.

The present invention can increase the design efficiency of an upper layer such as a job control means.

OTHER EMBODIMENTS

Though the embodiment of the present invention has been detailed above, the invention may be applied to a system constituted by a plurality of devices, or an apparatus comprising a single device.

Further, the invention can be implemented by supplying a software program, which implements the functions of the foregoing embodiments, directly or remotely to a system or apparatus, reading the supplied program code with a computer of the system or apparatus, and then executing the program code. Accordingly, since the functions of the present invention are implemented by computer, the program code installed in the computer is also included within a technical scope of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a home page on the Internet using a browser of the client computer, and the computer program of the present invention or an automatically-installable compressed file of the program can be downloaded from the home page to a recording medium such as a hard disk. Further, the program of the present invention can be supplied by dividing the program code constituting the program into a plurality of files and downloading the files from different home pages. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a home page via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing according to the instructions of the program, so that the functions of the foregoing embodiments can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing according to the instructions of the program, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-203707 filed on Jul. 9, 2004, the entire contents of which are hereby incorporated by reference herein.

The invention claimed is:

1. An image processing apparatus having a plurality of types of external interfaces different in protocol, comprising:
   protocol ID storing means for storing protocol IDs indicating a type of a protocol which the image processing apparatus can use;
   identifier allocating means for dynamically allocating identifiers within a predetermined range to the stored protocol IDs of the external interfaces as objects of processing; and
   job control means for controlling execution of various types of jobs by using the identifiers,
   wherein the predetermined range of identifiers is constant regardless of the number of types of external interfaces that are added or removed from the system while in process,
   wherein the predetermined range of identifiers indicates the number of processes which the image processing apparatus can perform in parallel with each other via the external interfaces, and
   wherein the number of the identifiers is smaller than the number of the protocol IDs stored in the protocol ID storing means.

2. An image processing apparatus according to claim 1, further comprising user interface control means for performing control corresponding to designation input via a user interface, by using an identifier.

3. An image processing apparatus according to claim 1, wherein the identifier allocating means allocates an identifier to a protocol corresponding to an external interface.

4. An image processing apparatus according to claim 1, wherein the identifier allocating means allocates an identifier to an external interface when processing using the external interface starts, and cancels the allocation of the external interface to the identifier when the processing terminates.

5. A control method of an image processing apparatus having a plurality of types of external interfaces different in protocol, comprising:

protocol ID storing step of storing protocol IDs indicating a type of a protocol which the image processing apparatus can use;

an identifier allocation step of dynamically allocating identifiers within a predetermined range the stored protocol IDs of the external interfaces as objects of processing; and a job control step of controlling execution of various types of jobs by using the identifiers, wherein the predetermined range of identifiers is constant regardless of the number of types of external interfaces that are added or removed from the system while in process, wherein the predetermined range of identifiers indicates the number of processes which the image processing apparatus can perform in parallel with each other via the external interfaces, and wherein the number of the identifiers is smaller than the number of the protocol IDs stored in the protocol ID storing step.

6. A control method according to claim 5, further comprising a user interface control step of performing control corresponding to designation input via a user interface, by using an identifier.

7. A control method according to claim 5, wherein in the identifier allocating step, an identifier is allocated to a protocol corresponding to an external interface.

8. A control method according to claim 5, wherein in the identifier allocating step, an identifier is allocated to an external interface when processing using the external interface starts, and cancels the allocation of the external interface to the identifier when the processing terminates.

9. A control program of an image processing apparatus having a plurality of types of external interfaces different in protocol, causing the image processing apparatus to execute:

a protocol ID storing step of storing protocol IDs indicating a type of a protocol which the image processing apparatus can use;

an identifier allocation step of dynamically allocating identifiers within a predetermined range to the stored protocol IDs of the external interfaces as objects of processing; and a job control step of controlling execution of various types of jobs by using the identifiers, wherein the predetermined range of identifiers is constant regardless of the number of types of external interfaces that are added or removed from the system while in process, wherein the predetermined range of identifiers indicates the number of processes which the image processing apparatus can perform in parallel with each other via said external interfaces, and wherein the number of the identifiers is smaller than the number of the protocol IDs stored in the protocol ID storing step.

10. A control program according to claim 9, causing the image processing apparatus to further execute a user interface control step of performing control corresponding to designation input via a user interface, by using an identifier.

11. A control program according to claim 9, wherein in the identifier allocating step, an identifier is allocated to a protocol corresponding to an external interface.

12. A control program according to claim 9, wherein in the identifier allocating step, an identifier is allocated to an external interface when processing using the external interface starts, and cancels the allocation of the external interface to the identifier when the processing terminates.

13. A computer readable storage medium storing a computer-executable control program of an image processing apparatus having a plurality of types of external interfaces different in protocol, the control program comprising:

a protocol ID storing step of storing protocol ID indicating a type of a protocol which the image processing apparatus can use;

an identifier allocation step of dynamically allocating identifiers within a predetermined range to the stored protocol IDs of the external interfaces as objects of processing; and a job control step of controlling execution of various types of jobs by using the identifiers, wherein the predetermined range of identifiers is constant regardless of the number of types of external interfaces that are added or removed from the system while in process, wherein the predetermined range of identifiers indicates the number of processes which the image processing apparatus can perform in parallel with each other via the external interfaces, and wherein the number of the identifiers is smaller than the number of the protocol IDs stored in the protocol ID storing step.

* * * * *